United States Patent [19]

Henry et al.

[11] Patent Number: 5,038,817
[45] Date of Patent: Aug. 13, 1991

[54] NARROW ACCESSWAY LIQUID SEWAGE PUMP REMOTELY OPERABLE MULTI-PART QUICK CONNECT/DISCONNECT SLIDE COUPLING

[75] Inventors: Clark A. Henry, Scotia; Eric F. Cabahug, Schenectady; Jack L. Cooley, Clifton Park; Richard C. Grace, Carlisle, all of N.Y.

[73] Assignee: Environment/One Corporation, Schenectady, N.Y.

[21] Appl. No.: 468,690

[22] Filed: Jan. 23, 1990

[51] Int. Cl.⁵ ............................................. F16K 43/00
[52] U.S. Cl. ..................... 137/315; 137/565; 251/144; 417/360
[58] Field of Search .............. 137/565, 315; 251/284, 251/327, 367, 144; 417/360, 361; 285/24, 325

[56] References Cited

U.S. PATENT DOCUMENTS

| | | | |
|---|---|---|---|
| 3,710,816 | 1/1973 | Prince | 251/327 |
| 3,771,915 | 11/1907 | Back | 417/360 |
| 4,765,361 | 8/1988 | Clifford | 251/327 |
| 4,822,213 | 4/1989 | Grace et al. | 137/363 |

Primary Examiner—A. Michael Chambers
Attorney, Agent, or Firm—Charles W. Helzer

[57] ABSTRACT

A narrow accessway sewage pump remotely operable, multi-part, quick connect/disconnect slide coupling comprising a fixed portion that forms a first part of a slide-together, bayonet-type coupling with a movable portion forming a second part of the coupling. The movable part of the coupling supports a liquid pump and slides together with and is physically supported by the fixed portion. A third slide stop valve portion is positioned intermediate both the fixed and movable portions and all three portions of the coupling have interiorly formed open passageways for passage of liquid therethrough. The passageways in the three portions all come into alignment upon the three portions being properly seated together in assembled relation. The three portions have complementary sealing surfaces formed thereon which come together automatically to form a liquid pressure-tight seal around the aligned interior liquid passageways through the three portions upon all the portions being slid into and properly seated in assembled relation within the fixed portion. The intermediate slide valve portion further includes a discharge outlet slide stop valve structure which normally is out of alignment with the interior open passageways through the assembled fixed and movable portions of the slide coupling with the slide coupling in the open position but which is closed over the interior aligned passageways with the slide coupling in the closed position.

17 Claims, 2 Drawing Sheets

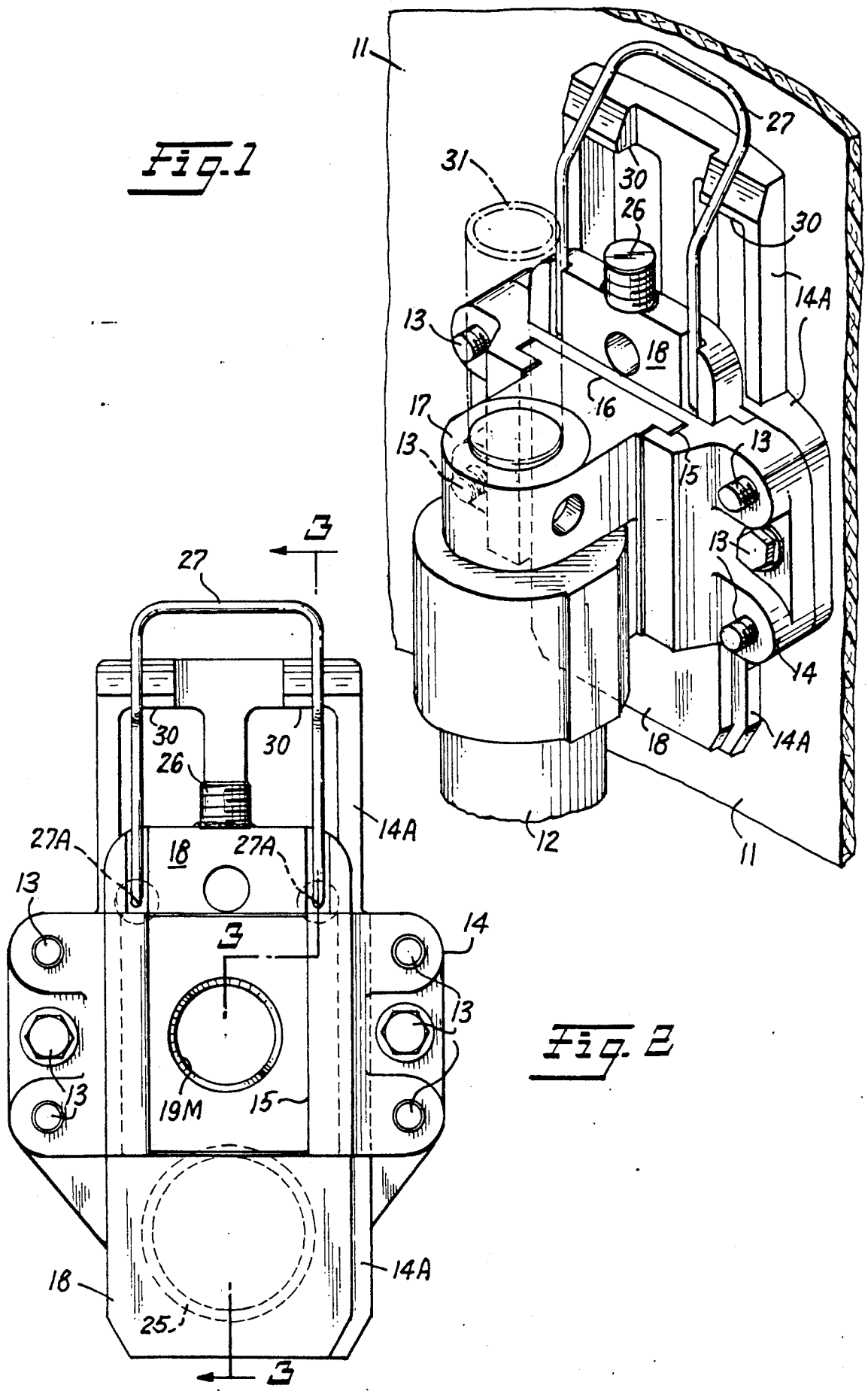

NARROW ACCESSWAY LIQUID SEWAGE PUMP REMOTELY OPERABLE MULTI-PART QUICK CONNECT/DISCONNECT SLIDE COUPLING

FIELD OF INVENTION

This invention relates to a remotely operable slide coupling for remote interconnecting of two separable liquid passageways in a fluid-tight manner.

More specifically, the invention relates to an improved quick connect/disconnect multi-part coupling for a narrow accessway liquid pumping facility whereby a liquid sewage pump can be lowered from the surface of the earth through a narrow accessway into a liquid collection tank and readily inter-coupled with a liquid outlet discharge pipe.

BACKGROUND PRIOR ART

U.S. Pat. No. 4,822,213 issued Apr. 18, 1989 for a "Narrow Accessway Sewage Collection Tank Assembly, Remote Operated Quick Connect/Disconnect Coupling and System Using the Same"—Richard C. Grace, Jack L. Cooley and Eric F. Cabahug, inventors and assigned to Environment/One Corporation of Schenectady, N.Y., describes a narrow accessway sewage collection tank assembly and system using a remote operated, two-part, quick connect/disconnect slide coupling. The slide coupling is used to support a sewage pump within an enlarged collection tank for installation below normal ground levels of residential, commercial and industrial buildings. The narrow accessway passage is of sufficient cross-sectional dimension to allow free passage up and down for installation and/or removal of a liquid pump unit, but is insufficient in cross-section to accommodate passage of human beings.

A two-part, quick connect/disconnect slide coupling is provided for physically supporting the liquid sewage pump unit within a collection tank properly positioned relative to the bottom to assure proper scouring and prevent build-up of solids. The coupling allows ready installation or removal of the liquid sewage pump unit from the surface by a service man using a remotely operated tool to couple/decouple the pump unit via the quick connect/disconnect, slide coupling and installing or withdrawing the liquid sewage pump unit downwardly/upwardly through the narrow accessway passage enclosure to the surface for ease of installation or removal for service, maintenance or replacement.

The quick connect/disconnect slide coupling described in U.S. Pat. No. 4,822,213 is suitable for many installations; however, its design is such that the integral stop valve structure which is part of the quick connect/disconnect slide coupling cannot be operated independently from the slide coupling used to mount the sewage pump. As a consequence, in this known coupling, it is necessary to remove or replace the movable portion of the slide coupling on which the sewage pump is secured in order to displace or move into its top valve position the slide stop valve portion of the coupling. In many circumstances, it is desirable or necessary that the slide stop valve be operable independently from the liquid sewage pump mounting structure, and to satisfy this need the present invention was devised.

SUMMARY OF INVENTION

It is therefore a principal object of the present invention to provide an improved, multi-part, quick connect/disconnect, slide coupling which includes a separately operable slide stop valve structure that can be closed and opened remotely from the surface of the earth by a service man independently of the movable liquid sewage pump support portion of the slide coupling without requiring that the associated pump be removed or replaced in the collection tank in order to activate or de-activate the slide stop valve structure.

In practicing the invention, a narrow accessway liquid pump, remotely operable, multi-part, quick connect/disconnect, slide coupling is provided which comprises a fixed portion that forms a first part of a slide-together, bayonet-type coupling with a movable portion forming a second part of the coupling. The movable portion is designed to support a liquid pump and slides together with and is physically supported by the fixed portion. A third (intermediate) slide stop valve portion is provided intermediate the fixed and movable portions and all three portions of the slide coupling have interiorly formed open passageways for passage of liquid therethrough. The open passageways come into alignment upon the three portions being properly seated together in assembled relationship. The three portions have complementary "O" ring sealing surfaces formed thereon which come together automatically to form a liquid pressure-tight seal around the aligned, interiorly-formed liquid passageway through the three axially aligned portions, upon the movable second and intermediate portions of the slide coupling being slid into and properly seated in assembled relationship within the fixed portion.

The intermediate slide valve portion includes a discharge outlet slide stop valve region which normally is out of alignment with the interior open passageway through the assembled fixed and movable portions of the slide coupling but which can be closed over the passageway during removal of the movable portion and appended sewage pump from a collection tank within which the slide coupling is used. Consequently, the intermediate slide valve portion of the coupling can be moved independently of the movable second portion of the slide coupling on which the sewage pump is supported within the collection tank.

BRIEF DESCRIPTION OF DRAWINGS

These and other objects, features and many of the attendant advantages of this invention will be appreciated more readily as the same becomes better understood and from a reading of the following detailed description, when considered in connection with the accompanying drawings, wherein like parts in each of the several figures are identified by the same reference characters, and wherein:

FIG. 1 is a fragmentary, perspective view of a narrow accessway liquid sewage pump, remotely operable, multi-part, quick connect/disconnect, slide coupling shown mounted on a portion of a sewage collection tank with the top end of the liquid sewage pump suspended therefrom;

FIG. 2 is a front elevational view on a smaller scale of the slide coupling with the male piping connector to the liquid sewage grinder pump removed for the purpose of clarity;

BEST MODE OF PRACTICING INVENTION

Figure 3:
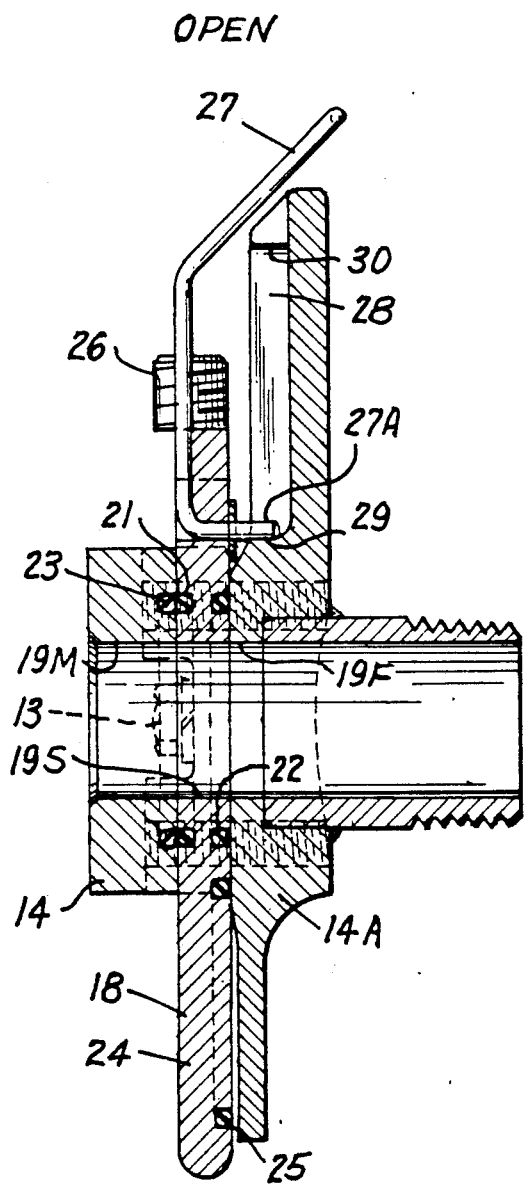
FIG. 3 is a vertical sectional view showing the details of construction of a fixed portion of the slide coupling with the intermediate slide valve portion shown in the open position taken along the staggered section line 3—3 of FIG. 2.

FIG. 1 is a fragmentary, perspective view of a narrow accessway sewage pump, remotely operable, multi-part, quick connect/disconnect, slide coupling according to the invention shown mounted on a fragmentary portion 11 of a sewage collection tank with the top end of a sewage pump (not shown) suspended therefrom via a connector pipe shown at 12. The slide coupling is secured to the side of the sewage collection tank 11 by means of bolts 13 which are threadably received in a two-part fixed portion 14 and 14A that forms a first part of a slide-together, bayonet-type coupling. The fixed two-part portion 14, 14A is secured at an appropriate point on the side walls of the sewage collection tank 11 prior to the collection tank being buried in the surface of the earth.

The fixed portion 14, 14A of the quick connect/disconnect slide coupling form a female, outwardly flaring, fluted, relatively wide, open upper and front surface 15 for receiving and capturing a complementary-shaped male sliding surface 16 formed on the confronting opposite front and side surfaces of a second, movable portion 17 of the quick connect/disconnect slide coupling upon the two portions 17 and 14 being slid together in assembled relationship. The design and construction is such that the bayonet-type, slide coupling provides structurally relatively strong, widely based, physical support for a sewage pump supported by movable portion 17 via the connector tube 12 and is effective in resisting torsional forces developed by the liquid sewage pump during operation thereof.

The multi-part, quick connect/disconnect, slide coupling further includes a third slide stop valve portion 18 which is positioned intermediate both the fixed portion 14, 14A and the movable portion 17. All three portions of the slide coupling while in assembled relation, have interiorly formed open passageways 19F in the fixed portion 14 and 14A, 19S in the movable third slide stop valve portion 18 (best shown in FIGS. 3 and 4), and 19M shown in dotted line form in FIG. 2 of the drawings. The interior passageways formed in all three portions of the slide coupling come into alignment upon the three portions being properly seated together in assembled relationship as shown in FIGS. 1, 3 and 4 of the drawings.

All three portions of the slide coupling have complementary "O" ring sealing surfaces formed thereon which come together automatically to form a liquid pressure tight seal around the aligned interiorly-formed liquid sewage passageway through the three portions upon the movable second and intermediate slide valve portions 17 and 18 of the slide coupling being slid together into and properly seated in assembled relation with respect to the fixed portion 14, 14A. The "O" rings on the intermediate slide valve portion 18 in FIGS. 3 and 4 of the drawings are comprised by two "O" ring seals 21 and 22 which coact with opposing flat surfaces on the fixed portions 14 and 14A, respectively, to form the desired liquid pressure-tight seal around the interior passageways 19F and 19S. A similar "O" ring sealing arrangement shown at 23 is formed between the mating surfaces of the movable portion 17 and the coacting surface 16 on fixed portion 14.

Figure 4:
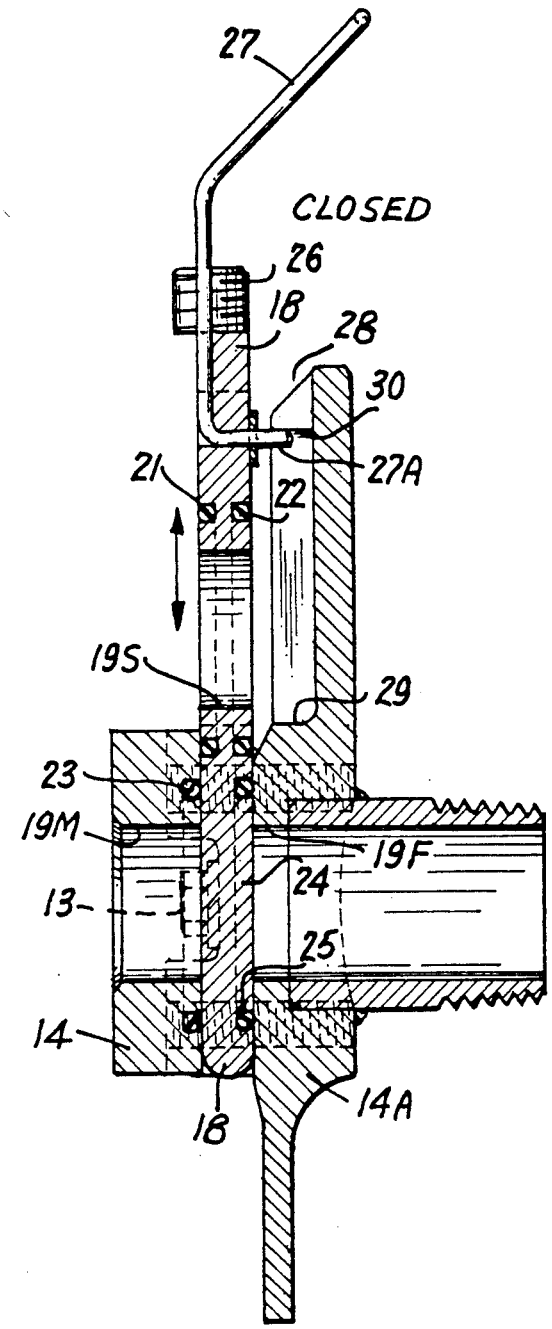
FIG. 4 is a view similar to FIG. 3, but showing the intermediate slide valve portion in the closed position.

As best shown in FIGS. 3 and 4 of the drawings, the intermediate slide valve portion 18 of the coupling further includes a discharge outlet slide stop valve structure or region 24 which normally is out of alignment with the interior open passageway through the assembled fixed and movable portions 14, 14A and 17 of the slide coupling. The stop valve region 24 includes its own "O" ring seal 25 which coacts with the complementary surface of the fixed portion 14A. With the slide valve portion 18 in the open condition as shown in FIG. 3 of the drawings, the interior open passageways 19F, 19S and 19M all come into alignment whereby liquid sewage under pressure can be transmitted through the slide coupling. Upon being shifted to its closed position as shown in FIG. 4, the slide stop valve region 24 is closed over the interior passageways 19F and 19M and prevents transmission of liquid sewage through the coupling.

In order to move the intermediate slide valve portion 18 between its open and closed position as shown in FIGS. 3 and 4, a threaded neck projection 26 is formed on the upper end of member 18. This threaded projection 26 forms a male threaded portion of a positive coupling provided by a long pipe (not shown) having complementary internal threads on its lower end which can be used by a serviceman from the surface to positively connect the long pipe to member 18 and move it either up or down as desired. A similar arrangement using an interiorly threaded receptor formed in the top surface of the movable portion 17, is designed to receive the lower, externally threaded end of a manipulating pipe 31 which is used by a serviceman to either install or remove a sewage pump supported within the container 11 by the quick connect/disconnect slide coupling. By designing the slide coupling in this manner, it is possible for the serviceman to open or close slide valve portion 18 independently of raising or lowering the sewage grinder pump via movable portion 17 of the slide coupling.

In order to secure the intermediate slide valve portion 18 in its open position as shown in FIG. 3 when set there by a serviceman on the surface above the collection tank in the abovedescribed manner, a positive acting stop in the form of a bale 27 is provided. The bale 27 is in the form of a crimped U-shaped wire having its two free ends 27A bent toward fixed portion 14A. The bent free ends 27A pass through openings in the intermediate slide valve member 18 upper end, below the threaded neck 26, and protrude beyond the back sliding surface of slide valve portion 18 as best shown in FIG. 3. The upper end of the fixed portion 14A has a hollowed-out area 28 formed therein which defines a shoulder stop 29 at the lower end thereof. The bent ends 27A of bale 27 extend to and engage the shoulder stop 29 upon the slide valve member 8 being set to its open position as shown in FIG. 3. This positive acting stop will prevent the intermediate slide valve portion 18 from sliding through and dropping out of the coupling while mounted in place on a sewage collection tank. With the slide stop valve member 18 in the closed condition shown in FIG. 4, the pressure of the sewage acting against the stop valve region 24 operates to hold the sliding stop valve member in its closed condition.

In order to positively stop upward travel of the intermediate slide stop valve member 18 while it is being set to its upper closed position shown in FIG. 4, the upper end of hollowed-out area 28 in the upper end of fixed portion 14 defines an upper shoulder stop 30 which is engaged by the bent-in ends 27A of bale 27. Hence, in resetting the slide stop valve member 18 to its upper closed condition shown in FIG. 4, a serviceman on the surface is positively stopped from raising slide member 18 too far and accidentally pulling it out of the coupling fixture.

INDUSTRIAL APPLICABILITY

The invention relates to an improved quick connect/disconnect, multi-part coupling for a narrow accessway liquid pumping facility, and allows a liquid pump to be installed from the surface of the earth through a narrow accessway into a liquid collection tank buried in the earth and readily inter-coupled with a liquid outlet discharge pipe. The coupling also easily can be remotely de-coupled to allow the liquid pump to be raised to the surface of the earth for maintenance, service or replacement. Such liquid pump facilities are used in residential, commercial and industrial buildings to collect and draw off liquid sewage.

Having described one embodiment of an improved narrow accessway sewage pump remotely operable, multi-part quick connect/disconnect slide coupling constructed in accordance with the invention, it is believed obvious that other modifications and variations of the invention will be suggested to those skilled in the art in the light of the above teachings. It is therefore to be understood that changes may be made in the particular embodiment of the invention described which are within the full intended scope of the invention as defined by the appended claims.

What is claimed is:

1. A narrow accessway liquid pump remotely operable multi-part, quick connect/disconnect, slide coupling comprising a fixed portion that forms a first part of a slide-together, bayonet-type coupling, a movable portion forming a second part of the coupling that is designed to support a liquid pump within an inaccessible enclosed space and that slides together with and is physically supported by the fixed portion, and a third intermediate slide valve portion intermediate both the fixed and movable portions, all three portions of the slide coupling having interiorly formed open passageways for passage of liquid therethrough which come into alignment to form an interior open liquid passageway through all three portions upon the three portions being properly seated together in an assembled relationship in an open condition;

said three portions having complementary sealing surfaces formed thereon which come together automatically to form a liquid pressure tight seal around the aligned interiorly-formed liquid passageway through the three portions upon the movable second and intermediate portions of the slide coupling being slid into and properly seated in assembled relation within the fixed portion; and said intermediate slide valve portion further including a liquid discharge outlet slide stop valve region which normally is out of alignment with the interior open liquid passageway through the assembled portions of the slide coupling with the slide coupling in the open position but which is closed over the interior aligned liquid passageway with the slide coupling in the closed position.

2. A quick connect/disconnect slide coupling according to claim 1 wherein the intermediate slide valve portion of the coupling can be moved independently of the first and second portions of the slide coupling by means of which a liquid pump can be supported within a collection tank.

3. A quick connect/disconnect, slide coupling according to claim 2 wherein the intermediate slide valve portion of the coupling can be closed with the liquid discharge outlet stop valve region positioned over and closing the interior liquid passageway with or without the movable second portion of the coupling and appended liquid pump mounted in place on the fixed portion of the coupling.

4. A quick connect/disconnect, slide coupling according to claim 3 further including sealing means formed around the liquid discharge outlet stop valve region of the intermediate slide valve portion for providing a positive fluid-tight seal between the discharge outlet of a liquid pump coupled to the second movable portion of the slide coupling and a pressure sewage discharge outlet conduit coupled to the fixed portion of the slide coupling.

5. A quick connect/disconnect, slide coupling according to claim 4 wherein the second, movable portion of the slide coupling includes remotely operable fixture means for remote surface attachment and detachment of a surface operated liquid pump lowering and lifting tool means for installing a liquid pump attached to the movable portion of the quick connect/disconnect slide coupling through a narrow accessway enclosure into operating condition on the fixed portion of the slide coupling secured in a liquid collection tank, or for removing the same.

6. A quick connect/disconnect, slide coupling according to claim 5 wherein the coupling further includes remote surface operated stop valve closing/opening means separately attached to the intermediate slide valve portion of the coupling to facilitate separate, remote opening/closing from the surface of the liquid discharge outlet stop valve region over the interior open passageway through the movable and fixed portions of the slide coupling.

7. A quick connect/disconnect, slide coupling according to claim 6 further including positive acting stop means on said third, movable, intermediate slide stop valve portion coating with the fixed portion of the slide coupling for positively locking the third intermediate slide valve portion in its open position while the coupling is set in the open condition.

8. A quick connect/disconnect, slide coupling according to claim 7 wherein the fixed portion of the quick connect/disconnect slide coupling has a female, outwardly flaring, fluted, relatively wide, open upper and front surface for slidably receiving and capturing a complementary-shaped male sliding surface formed on the confronting opposed front and side surfaces of the second, movable portion of the quick connect/disconnect slide coupling upon the two portions being slid together in operating relationship, and provides structurally relatively strong, widely based physical support for a liquid pump supported thereby for resisting torsional forces developed by the liquid pump.

9. A quick connect/disconnect, slide coupling according to claim 7 wherein the fixed portion of the quick connect/disconnect slide coupling has a first female, outwardly flaring, fluted, relatively wide, open upper and front surface for slidably receiving and capturing a complementary-shaped male sliding surface formed on the confronting opposed front and side surfaces of the movable second portion of the quick connect/disconnect slide coupling upon the two portions being slid together in assembled relationship, and second female openings in the upper and lower surfaces of the fixed portion spaced inside the first open upper and front surface defining a through passageway in the fixed portion for slidably receiving and capturing the third, slidable intermediate slide stop valve portion of the coupling, said slide coupling in assembled relationship with all of its parts providing relatively strong, widely based physical support for resisting torsion forces developed by a liquid pump secured within a collection tank by the coupling.

10. A quick connect/disconnect, slide coupling according to claim 9 wherein the positive acting stop means on said third, movable, intermediate slide valve portion coating with the fixed portion of the slide coupling positively locks the movable intermediate slide valve portion in its open position while the coupling is set in the open condition and positively stops and prevents accidental removal of the movable intermediate slide valve portion from the coupling while moving the intermediate slide valve portion from its open to its closed position to thereby place the coupling in a closed condition whereby liquid is not allowed to flow through the coupling.

11. A quick connect/disconnect, slide coupling according to claim 1 further including "O" ring sealing means formed around the liquid discharge outlet stop valve region of the intermediate slide valve portion for providing a positive fluid-tight seal between the discharge outlet of a liquid pump coupled to the second movable portion of the slide coupling and a pressure liquid discharge outlet conduit coupled to the fixed portion of the slide coupling.

12. A quick connect/disconnect, slide coupling according to claim 1 wherein the second, movable portion of the slide coupling includes remotely operable fixture means for remote surface attachment and detachment of a surface operated liquid pump lowering and lifting tool means for installing a liquid pump attached to the movable portion of the quick connect/disconnect slide coupling through a narrow accessway enclosure into operating condition on the fixed portion of the slide coupling secured in a liquid collection tank, or for removing the same.

13. A quick connect/disconnect, slide coupling according to claim 1 wherein the coupling further includes remote surface operated stop valve closing/opening means separately attached to the intermediate slide valve portion of the coupling to facilitate separate, remote opening/closing of the liquid discharge outlet stop valve region of the intermediate slide valve portion over the interior open liquid passageways through the fixed and movable portions of the slide coupling from the surface.

14. A quick connect/disconnect, slide coupling according to claim 1 further including positive acting stop means on said third, movable, intermediate slide valve portion coacting with the fixed portion of the slide coupling for positively locking the third intermediate slide valve portion in its open position while the coupling is set in the open condition.

15. A quick connect/disconnect, slide coupling according to claim 1 wherein the fixed portion of the quick connect/disconnect slide coupling has a female, outwardly flaring, fluted, relatively wide, open upper and front surface for slidably receiving and capturing a complementary-shaped male sliding surface formed on the confronting opposed front and side surfaces of the second, movable portion of the quick connect/disconnect slide coupling upon the two portions being slid together in operating relationship, and provides structurally relatively strong, widely based physical support for a liquid pump supported thereby for resisting torsional forces developed by the liquid pump.

16. A quick connect/disconnect, slide coupling according to claim 1 wherein the fixed portion of the quick connect/disconnect slide coupling has a first female, outwardly flaring, fluted, relatively wide, open upper and front surface for slidably receiving and capturing a complementary-shaped male sliding surface formed on the confronting opposed front and side surfaces of the movable second portion of the quick connect/disconnect slide coupling upon the two portions being slid together in assembled relationship, and second female openings in the upper and lower surfaces of the fixed portion spaced inside the first open upper and front surface defining a through passageway in the fixed portion for slidably receiving and capturing the third, slidable intermediate slide stop valve portion of the coupling, said slide coupling in assembled relationship with all of its parts providing relatively strong, widely based physical support for resisting torsion forces developed by a liquid pump secured within a collection tank by the coupling.

17. A quick connect/disconnect, slide coupling according to claim 1 further including positive acting stop means on said third, movable, intermediate slide valve portion coacting with the fixed portion of the slide coupling for positively locking the slide intermediate valve portion in its open position while the coupling is set in the open condition and for positively stopping and preventing accidental removal of the intermediate slide valve portion from the coupling while moving the slide valve portion from its open to its closed position.

* * * * *